Jan. 15, 1935. J. P. BURKE 1,987,601
PURIFICATION OF ALCOHOLS
Filed May 26, 1932
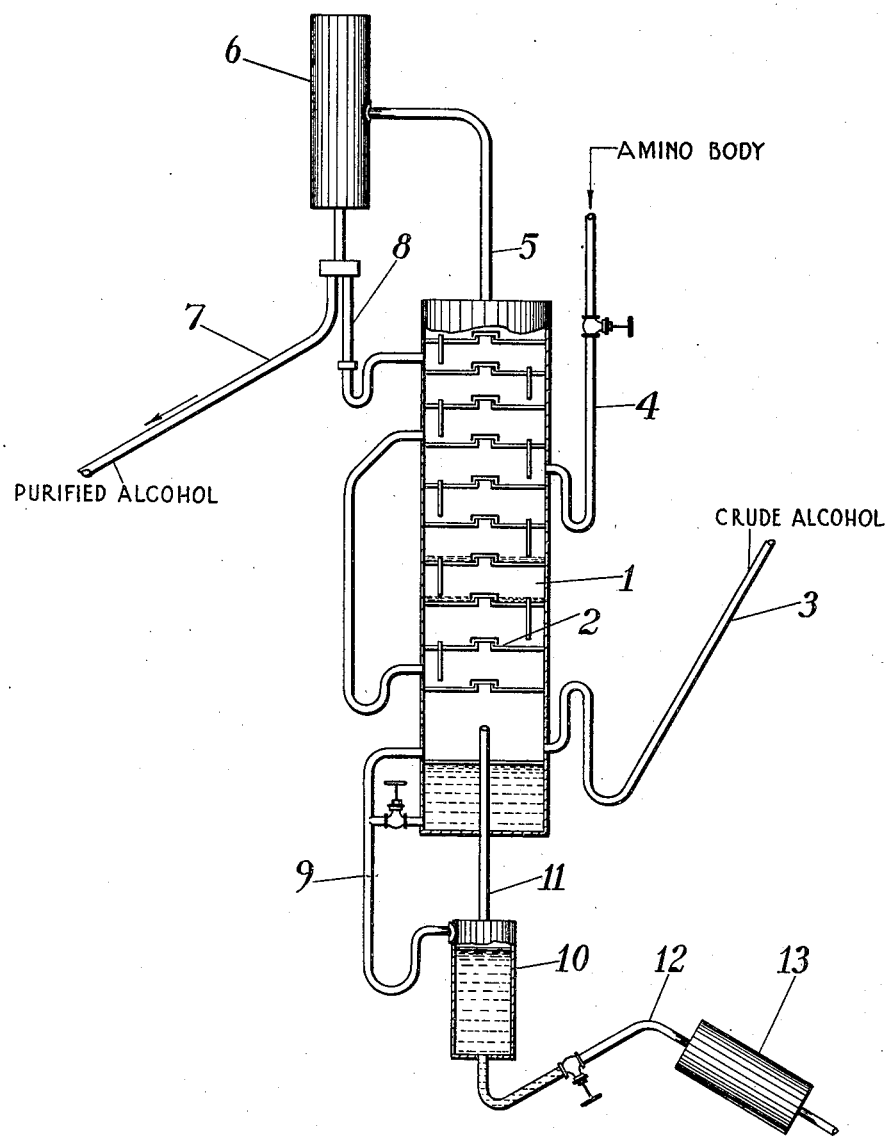
Joseph P. Burke  INVENTOR
BY
*J. M. Castle*
ATTORNEY Patented Jan. 15, 1935

1,987,601

UNITED STATES PATENT OFFICE 1,987,601

PURIFICATION OF ALCOHOLS

Joseph P. Burke, Highland Park, N. J., assignor to E. I. du Pont de Nemours & Company, Wilmington, Del., a corporation of Delaware Application May 26, 1932, Serial No. 613,692

17 Claims. (Cl. 260—156)

This invention relates to a process of purifying aldehyde-containing alcohols, and more particularly, relates to a process of removing the aldehydes or substantially lowering the aldehyde content of aldehyde-containing lower aliphatic alcohols by bringing such alcohols into contact with a monoamine.

It is known that the aliphatic alcohols contain aldehydes, the presence of which is very objectionable in many uses to which the alcohols are to be put. This is particularly true where the alcohols are to be used as solvents in the manufacture of lacquers, and the like, as the aldehydes have a tendency to discolor the alcohols, resulting in the final lacquer being off color. Furthermore, these aldehydes are the source of a disagreeable odor and have a tendency to oxidize to acids, giving the alcohols undesirable properties.

The removal of these aldehyde impurities from alcohols has heretofore been considered and various oxidizing agents have been suggested for this purpose. However, these agents did not appreciably reduce the aldehyde content of the alcohols and have not been commercially successful.

An object of the present invention is to provide a practical and economical process of removing aldehyde impurities from alcohols, or substantially reducing the proportion of the aldehyde impurities. A further object is to provide such a process which may be carried out continuously. Still further objects will be apparent from the description of the invention given hereinafter.

The above objects are accomplished according to the present invention by bringing the aldehyde-containing alcohol into contact with a monoamine whereby the aldehydes contained in the alcohol react with the monoamine, and then subsequently separating the alcohol from the reaction product and any excess monoamine.

This process may be carried out in several ways. For instance, the alcohol may be vaporized and passed through the monoamine in liquid state, or the monoamine may be vaporized and passed through the alcohol in liquid state, or the alcohol and monoamine, both in liquid state, may be introduced into a still kettle and refluxed until the monoamine has reacted with the aldehydes contained in the alcohol, and the alcohol then recovered in purified state by fractional distillation. When the process is carried out using a monoamine in the liquid state, a monoamine which is liquid at the temperature of the reaction may be used, or a solid monoamine dissolved in an inert solvent may be used. In order to secure a maximum removal of the aldehyde contamination, the monoamine should be used in excess of molecular proportion with respect to the aldehyde impurity.

The following examples are given to illustrate preferred embodiments of the invention:

Example 1.—The following charge was placed in a still kettle:—100 grams of contaminated ethyl alcohol (0.62% aldehydes), 1.1 gram of aniline, and 0.2 grams of sulphuric acid. This charge was refluxed for 15 minutes and subsequently fractionally distilled to separate the purified alcohol. An analysis of the purified ethyl alcohol showed an aldehyde content of 0.042%. The purpose of the sulphuric acid was merely to act as a catalyst, a slight improvement being noted in some cases through the use of such a catalyst.

The above example illustrates the process wherein both the alcohol and monoamine are in the liquid state. Carrying out the process in this manner, a solid monoamine dissolved in the alcohol being treated, or some other solvent could be used. For example, acetanilide dissolved in alcohol.

The following four examples illustrate a more continuous modification of the process wherein the aldehyde contaminated alcohols are bubbled through aniline in the still kettle, the temperature of the kettle being maintained at such a degree as to flash off the alcohols from the still.

Example 2.—Methyl alcohol 500 cc., acetaldehyde added to give 1.4395% impurity, aniline 15 cc., acetic acid .5 cc. The alcohol was bubbled through the aniline in the kettle with a temperature high enough to flash the alcohol from the aniline. This produced a product containing .1331% acetaldehyde.

Example 3.—500 cc. of ethyl alcohol, crotonaldehyde added to give 1.428% impurity, 50 grams of aniline and .5 cc. of sulfuric acid. The alcohol was bubbled through the aniline and the temperature in the kettle was maintained at a sufficient temperature to flash the alcohol from the kettle. This process produced an alcohol after the aniline treatment containing .1387% aldehyde.

Example 4.—Butyl alcohol 500 cc., acetaldehyde added to give 2.104% impurity, aniline 50 cc. and acetic acid .5 cc. One pass of this contaminated alcohol through the aniline reduced the aldehyde content to .4727%. The kettle temperature during this operation was approximately 125° C.

Example 5.—Butyl alcohol 500 cc., crotonaldehyde added to give 1.844% impurity, aniline 50 cc., and acetic acid .5 cc. One pass of this contaminated alcohol through the aniline reduced the aldehyde content to .5191%. The temperature of the alcohol was kept at approximately 125° C.

In the above four examples the alcohol in the vapor state was passed through the monoamine in the liquid state. In this modification it is apparent that the monoamine must have a boiling point appreciably higher, at least 15° C., than that of the alcohol being treated. Either a high boiling monoamine, such as aniline, may be used, or a monoamine such as acetanilide, which is solid at ordinary temperatures but liquid at the temperature of reaction.

In a preferred embodiment of the invention, the process is carried out continuously by scrubbing the aldehyde contaminated alcohol in the vapor state with a monoamine in a liquid state, flowing counter current to the alcohol vapors in a column provided with a series of conventional bubbler plates, the monoamine, together with the reaction product of the monoamine and the aldehyde impurities in the alcohol vapors, being drawn off at the bottom of the column and the purified alcohol vapors from the top of the column.

Referring to the single figure of the drawing, 1 represents a still column provided with a series of conventional bubbler plates 2. An inlet pipe 3 serves to introduce crude alcohol into the column, which is heated sufficiently at the bottom to vaporize the alcohols introduced, the vapors passing up through the bubbler plates 2 down which flows a monoamine in liquid state supplied by the pipe 4. The alcohol vapors are removed through the pipe 5 at the top of the column 1 to the condenser 6, the condensed alcohol being drawn off through the pipe 7, or a small portion may be run through the connection 8, back into the column adjacent the top thereof to maintain reflux action at the top of the column. An overflow pipe 9 adjacent the base of the column serves to continuously remove the liquid monoamine and reaction products collecting at the bottom of the still; condensed alcohol vapor carried down the column with the monoamine is again vaporized at the bottom of the column, which is kept at a temperature above the boiling point of the alcohol. The overflow pipe 9 leads to the reboiler 10, which is heated to a temperature considerably above the boiling point of the alcohol being treated, but lower than the boiling point of the monoamine. Any alcohol still carried by the monoamine is vaporized in the reboiler and let back into the column 1 through the pipe 11. The monoamine and reaction products are drawn off through the pipe 12 to the condenser 13 from where they may be led back into the column 1 for further use, if desired.

The following specific example illustrates the purification of ethyl alcohol by means of aniline in the continuous process carried out in the apparatus described above:

*Example 6.*—Aldehyde contaminated ethyl alcohol is introduced into the column 1 through pipe 3 at the rate of 180–200 gallons per hour; the temperature at the bottom of the column is kept at 78–90° C., causing the alcohol to vaporize and pass up through the column. Aniline is introduced through the pipe 4 at the rate of 4–6 gallons per hour. The alcohol vapors pass through the pipe 5 into the condenser 6 and the condensed alcohol is then drawn off through the pipe 7 except for a small proportion run through the pipe 8 back into the column 1 to maintain reflux action at the top of the column. If the aniline is being used a second time, the rate of flow should be stepped up to 8–9 gallons per hour, and if being used a third time, to 9–12 gallons per hour. The reboiler is kept at a temperature of 130° C. which is sufficient to vaporize any ethyl alcohol retained by the aniline without danger of vaporizing the aniline or the aniline-aldehyde reaction product.

In large scale operation, this process maintains an efficiency of around 90%. Ethyl alcohol containing 1.5% aldehyde impurities (acetaldehyde and butyraldehyde chiefly) may be readily reduced to 0.1% aldehyde impurity. Ethyl alcohol containing 0.35% to 0.55% aldehyde impurities may be readily reduced to 0.03% or to 0.06%, and on occasions the above process has functioned to reduce the aldehyde content as low as 0.008% from the original aldehyde content of approximately 0.4%.

In carrying out this process it is advisable to introduce the monoamine at a point part way down the column, as if it is introduced at the very top of the column there is danger of the purified alcohol being contaminated with aniline. Also, in an efficient operation of this process, care should be taken to insure an excess of aniline in the column at all times.

The above examples merely illustrate specific embodiments of the invention which is broadly applicable to the purification of the lower alcohols in which the alkyl group contains 1–6 carbon atoms, inclusive. Some of the common alcohols which may be purified by this process are as follows: methyl alcohol, ethyl alcohol, propyl alcohol, butyl alcohol, amyl alcohol, hexyl alcohol, besides secondary and iso-alcohols of various types.

The term monoamine is meant to include only compounds having the formula $$R\text{---}NH_2$$

where R is a hydrocarbon radical, their acid addition products, and such compounds as would be formed by the substitution for one of the hydrogen atoms, such groups as monovalent hydrocarbon groups or acyl groups. Due to their greater activity in combining with the aldehyde contaminations, primary amines and their acid salts are preferred, although other monoamines may be used. Monoamines that are particularly suitable for use in this process include aniline, or aniline to which a small amount of an acid such as acetic or sulfuric, has been added as a catalyst, acetanilide, diphenylamine, methylamine, ethylamine, propylamine, and naphthylamine.

It will be understood that the selection of any particular monoamine will be dependent upon the modification of the process to be used and the boiling point of the alcohol to be treated. Where either the monoamine or the alcohol is to be in the vapor state and the other in a liquid state, a difference of at least 15° C. in the boiling point is necessary, and preferably a considerably greater difference. Where both the monoamine and the alcohol are to be in the liquid state, it is only necessary that the respective boiling points are separated enough to insure complete separation by fractional distillation. A difference of at least 15° C. in boiling points is also preferred here.

The advantages of the process according to the present invention over those of the prior art are primarily that the aldehyde contamination can be substantially eliminated, whereas heretofore this has not been commercially feasible. Furthermore, the present process may be economically carried out without great detailed attention and with great economy of time. The continuous modification of the process described above is preferred in that it is more economical on a commercial scale. The removal of aldehyde contamination is greater and the general operation is more efficient.

As many apparently widely different embodiments of this invention may be made without departing from the spirit and scope thereof, it is to be understood that the invention is not limited to the specific embodiments thereof except as defined in the appended claims.

I claim:

1. Process of purifying an aldehyde contaminated lower aliphatic alcohol which comprises bringing a monoamine into contact with the alcohol whereby the aldehyde contained in said alcohol reacts with the monoamine, and separating the alcohol from said monoamine and the reaction product.

2. Process of purifying an aldehyde contaminated lower aliphatic alcohol which comprises bringing aniline into contact with the alcohol whereby the aldehyde contained in said alcohol reacts with the aniline, and separating the alcohol from said aniline and the reaction product.

3. Process of purifying aldehyde contaminated ethyl alcohol which comprises bringing a monoamine into contact with the ethyl alcohol whereby the aldehyde contained in said ethyl alcohol reacts with the monoamine, and separating the ethyl alcohol from said monoamine and the reaction product.

4. Process of purifying aldehyde contaminated ethyl alcohol which comprises bringing aniline into contact with the ethyl alcohol whereby the aldehyde contained in said ethyl alcohol reacts with the aniline, and separating the ethyl alcohol from said aniline and the reaction product.

5. Process of purifying an aldehyde contaminated lower aliphatic alcohol which comprises passing a monoamine in vapor state through the alcohol in liquid state whereby the aldehyde contained in said alcohol reacts with the monoamine, and separating the alcohol from the reaction product.

6. Process of purifying an aldehyde contaminated lower aliphatic alcohol which comprises passing ammonia through the alcohol in liquid state whereby the aldehyde contained in said alcohol reacts with the ammonia, and separating the alcohol from the reaction product.

7. Process of purifying an aldehyde contaminated lower alcohol which comprises passing the alcohol in vapor state through a monoamine in liquid state whereby the aldehyde contained in said alcohol reacts with the monoamine, and separating the alcohol from said monoamine and the reaction product.

8. Process of purifying an aldehyde contaminated lower aliphatic alcohol which comprises passing the alcohol in vapor state through aniline in liquid state whereby the aldehyde contained in said alcohol reacts with the aniline, and separating the alcohol from the aniline and the reaction product.

9. Process of purifying aldehyde contaminated ethyl alcohol which comprises passing the ethyl alcohol in vapor state through a monoamine in liquid state whereby the aldehyde contained in said ethyl alcohol reacts with the monoamine, and separating the ethyl alcohol from said monoamine and the reaction product.

10. Process of purifying aldehyde contaminated ethyl alcohol which comprises passing the ethyl alcohol in vapor state through aniline in liquid state whereby the aldehyde contained in said ethyl alcohol reacts with the aniline, and separating the ethyl alcohol from the aniline and the reaction product.

11. Process of purifying an aldehyde contaminated lower aliphatic alcohol which comprises continuously vaporizing the alcohol, passing the vapors up through successive layers of a monoamine in liquid state whereby the aldehyde contained in said alcohol reacts with the monoamine, and continuously adding fresh monoamine to said layers and withdrawing the reacted monoamine.

12. Process of purifying an aldehyde contaminated lower aliphatic alcohol which comprises continuously vaporizing the alcohol, passing the vapors up through successive layers of aniline in liquid state whereby the aldehyde contained in said alcohol reacts with the aniline, and continuously adding fresh aniline to said layers and withdrawing the reacted aniline.

13. Process of purifying aldehyde contaminated ethyl alcohol which comprises continuously vaporizing the ethyl alcohol, passing the vapors up through successive layers of a monoamine in liquid state whereby the aldehyde in said ethyl alcohol reacts with the monoamine, and continuously adding fresh monoamine to said layers and withdrawing the reacted monoamine.

14. Process of purifying aldehyde contaminated ethyl alcohol which comprises continuously vaporizing the ethyl alcohol, passing the vapors up through successive layers of aniline in liquid state whereby the aldehyde in said ethyl alcohol reacts with the aniline, and continuously adding fresh aniline to said layers and withdrawing the reacted aniline.

15. Process of purifying an aldehyde contaminated lower aliphatic alcohol which comprises passing the alcohol in vapor state up through a column provided with bubbler plates while passing down said column a monoamine in liquid state, the temperature at the bottom of the column being maintained above the boiling point of the alcohol and below the boiling point of the monoamine.

16. Process of purifying an aldehyde contaminated lower aliphatic alcohol which comprises passing the alcohol in vapor state up through a column provided with bubbler plates while passing down said column aniline in the liquid state, the bottom of the column being maintained at a temperature above the boiling point of the alcohol and below the boiling point of the aniline.

17. Process of purifying aldehyde contaminated ethyl alcohol which comprises passing the ethyl alcohol in vapor state up through a column provided with bubbler plates while passing down said column aniline in the liquid state, the bottom of the column being maintained at a temperature above the boiling point of the ethyl alcohol but not exceeding 90° C.

JOSEPH P. BURKE.